US 6,550,346 B2

(12) United States Patent
Gombert et al.

(10) Patent No.: US 6,550,346 B2
(45) Date of Patent: Apr. 22, 2003

(54) DEVICE FOR SENSING RELATIVE MOVEMENTS BETWEEN AN OBJECT AND A BASEPLATE

(75) Inventors: Bernd Gombert, Grafrath (DE); Johanndes Dietrich, Gilching (DE); Volker Senft, Seefeld (DE)

(73) Assignee: Deutsches Zentrum fur Luft- und Raumfahrt e.V., Köln (DE)

( * ) Notice: Subject to any disclaimer, the term of this patent is extended or adjusted under 35 U.S.C. 154(b) by 0 days.

(21) Appl. No.: 09/904,542

(22) Filed: Jul. 16, 2001

(65) Prior Publication Data

US 2002/0056326 A1 May 16, 2002

(30) Foreign Application Priority Data

Jul. 14, 2000 (DE) .......................................... 100 34 569

(51) Int. Cl.$^7$ .............................. G01D 7/00; G01J 1/42
(52) U.S. Cl. .............................. 73/862.043; 73/514.26; 250/208.6
(58) Field of Search ...................... 73/862.044, 862.045, 73/862.043, 862.44, 862.631, 862.451, 862.046, 514.28; 600/446; 250/208.6

(56) References Cited

U.S. PATENT DOCUMENTS

| 3,535,923 A | | 10/1970 | Martorana et al. | |
|---|---|---|---|---|
| 3,592,054 A | | 7/1971 | Stewart et al. | |
| 4,763,531 A | * | 8/1988 | Dietrich et al. | 73/862.04 |
| 4,785,180 A | | 11/1988 | Dietrich et al. | |
| 5,315,882 A | * | 5/1994 | Meyer et al. | 73/862.044 |
| 5,648,617 A | * | 7/1997 | Cullen et al. | 73/862.045 |
| 5,889,214 A | * | 3/1999 | Kang et al. | 73/862.044 |
| 5,905,212 A | * | 5/1999 | Moses et al. | 73/862.451 |
| 6,308,583 B1 | * | 10/2001 | Gunness et al. | 73/862.631 |

FOREIGN PATENT DOCUMENTS

| DE | 17 73 870 | 1/1972 |
|---|---|---|
| DE | 277 330 | 3/1990 |
| DE | 39 40 696 | 11/1993 |
| DE | 196 40 717 A1 | 4/1998 |
| EP | 0 240 023 | 8/1990 |

OTHER PUBLICATIONS

European Patent Office, *Patent Abstracts of Japan*, Abstract for JP 60177233, "Multiple Force Component Detector", Nippon Telegr & Teleph Corp, Sep. 11, 1985.

* cited by examiner

*Primary Examiner*—Harshad Patel
(74) *Attorney, Agent, or Firm*—Browdy and Neimark, P.L.L.C.

(57) ABSTRACT

For sensing the relative movements of an object a force sensing unit (15) comprises a stationary supporting means (6) and a cap (150) located movable relative to said supporting means as well as a force/moment sensor (1) for sensing the three possible translational and three possible rotational movements of the cap relative to said supporting means. Said sensing unit with its cap is secured in the middle of said input flange and with its supporting means to said other flange so that it does not come into contact with said intermediate part (14), or is secured differingly to the latter by its cap to a connecting part (19) provided in the middle portion of said approximately ring-shaped intermediate part and protruding into the interior thereof and by its supporting means to said other flange, so that translational and rotational relative movements between said input flange and said flange secured to said baseplate are communicated via said intermediate part to said sensing unit and to said force/moment sensor contained therein.

21 Claims, 3 Drawing Sheets

DEVICE FOR SENSING RELATIVE MOVEMENTS BETWEEN AN OBJECT AND A BASEPLATE

BACKGROUND DESCRIPTION

1. Field of the Invention

The invention relates to a means for sensing the relative movements of an object as set forth in the preamble of claim 1. The invention relates furthermore to possible applications of the means.

2. Prior Art

Known from DE 17 73 870 A1 is a load-sensitive transducer including a deformable intermediate piece disposed between two rigid flanges arranged longitudinally axial, the intermediate piece having the shape of a solid or hollow cylinder and comprising in its interior one or more load-sensitive elements, e.g. electrical strain gages producing a change in the electrical resistance as a function of the deformation of the intermediate piece caused by mechanical stress.

In one achieved embodiment four strain gages are contained in the solid cylindrical intermediate piece in two pairs in parallel, the strain gages of the one pair being arranged parallel to the direction of the exerted load, i.e. axially, whilst the strain gages of the other pair are arranged perpendicular to this direction. The strain gages of each pair are inserted in each diametrically opposed branch of an electric bridge circuit of a measurement device in each case for indicating the direct current of the bridge and thus the load exerted.

In another achieved embodiment only one or two electrical strain gages are inserted in a hollow cylindrical intermediate piece parallel to the exerted load, i.e. axially. In any case the load-sensitive elements, i.e. for example the strain gages are contained in the intermediate piece itself and thus incorporated therein so that the deformation caused by the mechanical stress can be accommodated at all in the intermediate piece.

To ensure that the electrical output values of the strain gages are practically independent of the spatial location of the strain gages in the intermediate piece in each case and that the exerted load is evenly distributed over the cross-section of the deformable intermediate piece, there is additionally inserted between each of the two flanges and the deformable intermediate piece a further body made of an elastomer material, e.g. rubber. The intention of this known arrangement is to measure the mechanical load exerted on the two flanges so that the indication achieved with the aid of the load-sensitive elements, i.e. e.g. the strain gage is substantially independent of the effective line of the load through the intermediate piece.

This known means permits sensing certain relative movements of an object and comprises an input flange securable to the object, a flange rigidly connected to a baseplate, and in the second achieved embodiment in addition a roughly ring-shaped intermediate piece arranged between the two flanges to which it is connected resistant to turning and shifting out of place and is made of an elastomer and including a force-sensing unit in its interior for sensing the movement of each flange relative to the other.

However, this known means permits sensing and measuring substantially only vertical relative movements of an object, but not any side or slanting relative movements and not at all any rotary excursion.

Known from DD 277 330 A1 is an ON/OFF force sensor including a rubber ring mounted on a baseplate, on which a cover plate is located exposed to a force from above as is to be measured. Applied to the inner circumference of the rubber ring, as a connecting part, is an open flexible ring, to the one end of which an electrical springer switch and to the other end of which a set screw is attached which urges the plunger of the springer switch.

Thus, the electrical springer switch is activated by the deformation of the rubber ring caused by the force acting thereon, resulting in a change in the diameter of the flexible ring. The circumference of the flexible ring is accordingly altered by roughly three times which makes for a higher reliability in the response of the springer switch. However, with this known force sensor only the vertical component of a force, i.e. a vertical relative movement of an object can be determined substantially. In this case too, this does not involve a force/moment sensor with which substantially a broad variety of relative movements can be sensed and measured as with the present invention.

Known from DE 39 40 696 C2 is a force sensor producing a practically linear electrical output signal as a function of the active force of the displacement to be sensed, wherein no change in the point at which the force is active occurs, but instead a lengthening of the sensor body in the direction in which the force is active. This force sensor has a folded-type structure and comprises in an effective partial range a mechanical electrical transducer element which is sensitive to the shortening of the surface of the transducer element when the sensor is exposed to tensile loading, this shortening being caused by the bending of the surface about an axis extending parallel to the direction in which the force is effective. This known force sensor too, responds substantially only to relative movement in one direction, in this case in the longitudinal direction of the force sensor.

Suitable for sensing a variety of relative movements are force/moment sensors as known for example from DE 36 11 336 C2 or EP 0 240 023 B1. With the aid of such a force/moment sensor linear displacements and/or rotary excursions can be sensed and converted for example directly into translational and rotational movements in thus permitting the control of automated machines, robotic manipulators or similar systems.

Both the force/moment sensors as cited above as well as all force/moment sensors currently on the market have only a relatively limited stiffness, or, in other words, no high forces or torques can be sensed and processed by these known force/moment sensors. In the case of robotic manipulators, for example, torques of a magnitude in the region of 100 Nm and more may occur at the welding tongs manipulated thereby. Such high torques cannot be sensed and/or processed by force/moment sensors currently available, however.

SUMMARY OF THE INVENTION

It is thus the objective of the invention to provide a means in making use of a force/moment sensor with which the relative movements of objects, especially also of large and correspondingly heavy objects, can be sensed. The intention is to permit sensing and measuring a wide variety of relative movements of an object so that the results can then be analyzed and more particularly made use of for precisely controlling and monitoring the momentary location of the object even when the objects involved are very large and heavy.

In accordance with the invention this objective is achieved by the features in the characterizing clause relating to a means as set forth in the preamble of claim 1. Advantageous further embodiments and possible applications of the invention are the subject matter of the sub-claims.

Unlike the embodiment of the invention in which the cap of the sensing unit, provided in the internal portion of the intermediate part, is secured to the force/moment sensor in the middle of the input flange to thus totally sense and transduce the translational and rotational movements, in the other embodiment in which the sensing unit with its cap is secured to a connecting part provided in the middle portion of the roughly ring-shaped intermediate part and protruding into the interior thereof, only approximately half of the translational and rotational values are available in each case for analysis.

In accordance with one advantageous aspect of the invention the multiple-piece intermediate part may be formed of approximately ring-shaped sections of approximately rectangular cross-section or also of approximately circularly arranged cuboidal elements. Furthermore, the multiple-piece intermediate part may also be configured of cylindrical elements arranged approximately circularly with a square, rectangular, polygonal and/or circular cross-section.

In accordance with another advantageous aspect of the invention both the approximately circularly configured one-piece intermediate part and the approximately ring-shaped multiple-piece intermediate part consisting of the same and/or different elements may contain same and/or differingly dimensioned webs and/or also struts preferably arranged like a trussed structure. In addition, the elements of a multiple-piece intermediate part may also be configured as a hollow body having a cross and/or criss-cross type structure.

With the means in accordance with the invention when making use of force/moment sensors as known, for example, from U.S. Pat. No. 4,763,531 or U.S. Pat. No. 4,785,180 with which, for example, translational displacements in the magnitude of maximally ±1.5 mm or rotational movements in the magnitude of a few angular degrees can be sensed, relative movements prompted also by objects weighing less than a kilopond (kp) up to several hundred tons (t) can now be sensed and thus ultimately measured depending on the size and design of the intermediate part produced of elastomer or cast resin.

For example, in checking the vertical orientation of a crane or to sense impending tilt or elevation movements, the crane can be mounted on a correspondingly dimensioned platform under which means numbering three, four or more in accordance with the invention are arranged whose intermediate elements are adequately dimensioned in accordance with the anticipated loads and stresses.

With such an array of means configured in accordance with the invention under the platform on which the crane is mounted, even the slightest departure from the vertical and thus also any impending elevation angle can be instantly sensed without any difficulty so that countermeasures as may be needed can be instigated in due time. In this way, it is thus possible, for example, to also avoid buckling of a load crane.

Instead of a crane, it is just as possible to mount on a correspondingly dimensioned platform a robotic device, a machine tool as well as any machine correspondingly designed in function and configuration. Yet another possible application of the means in accordance with the invention consists of attaching it, for example, to the end of a robotic arm and, for example, a holding or gripping device manipulated by the robotic device.

Furthermore, the means in accordance with the invention may also be put to use to advantage in vehicle final assembly, by at least one of the means in accordance with the invention being provided in each case in or on pins of racks on which frames are positioned to which in turn further frame and/or body parts of a vehicle in production are secured, for example, by means of welding tongs.

As soon as a first spot is set via the welding tongs controlled by the robotic device, a force or pressure is exerted thereby on the rack, it being at this moment that six possible degrees of freedom are sensed and measured by each sensor of the means in accordance with the invention provided in or on the pins.

This means that when, for example, four force/moment sensors are provided on or in four different pins of the rack, (4×6) degrees of freedom materialize, i.e. 24 so-called input neuroses can be "trained" which can be analyzed to precisely determine where the first weld spot has been set.

When the next, i.e. second welding spot is made, it can thus be assured in this way that it is correctly set. Making use of the means in accordance with the invention or the force/moment sensors provided therein thus permits absolute positioning accuracy to be produced between robotic device and frame, resulting in all further welding spots being set with high accuracy.

The same result is achievable when means in accordance with the invention are placed under a robotic device to thus permit measuring a force exerted by the robotic device as a reaction force whilst precisely determining the location at which the exerted force has been applied. Accordingly, it is not mandatory that the means in accordance with the invention is fitted in a robotic joint, instead, as already mentioned above, the robotic device can be mounted on a correspondingly dimensioned platform under which a number of, for example, three, four or more means are arranged, each provided with a force/moment sensor.

The means in accordance with the invention may also find application in the security area of a bank, for example. In this case a number of means in accordance with the invention including force/moment sensors are arranged under a correspondingly dimensioned gangplate. Anybody walking over such a plate "prepared" as described above leaves a trail of "footprints" which in sequence and gait is just as unique as, for example, a fingerprint for the person concerned in being precisely recorded for identification.

BRIEF DESCRIPTION OF THE DRAWINGS

The invention will now be described in detail with reference to the drawings in which.

DETAILED DESCRIPTION

Figure 1:
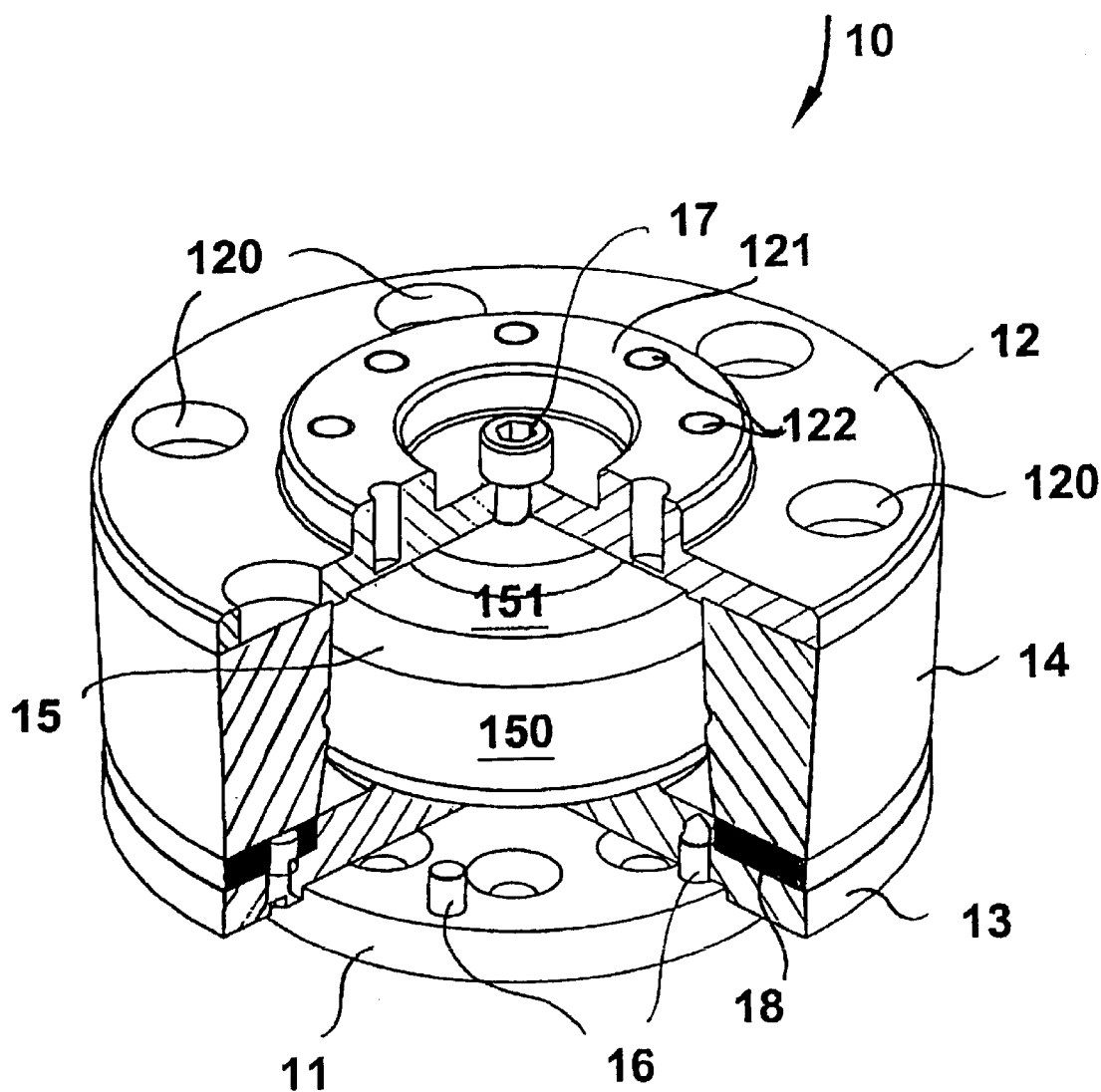
FIG. 1 is a view in perspective of a first embodiment of a means for sensing relative movements as shown partly sectioned schematically.

Referring now to FIG. 1 there is illustrated a view in perspective of a first embodiment of a means for sensing relative movements, identified in its entirety by reference numeral 10. In FIG. 1 the means 10 comprises a circular input flange 12 forming with a supporting ring 121 a single unit in which a number of drilled holes 122 are provided preferably female tapped. The object, whose relative movements are to be sensed, is secured to the supporting ring 121, for example, by it being bolted thereto.

Provided below the input flange 12 as shown in FIG. 1 is an intermediate part 14 configured approximately ring-shaped in one piece, comprising an approximately rectangular cross-section surface area, depicted shaded in the partly sectioned illustration, including a demolding bevel. The intermediate part 14 is made of an elastomer or cast resin, such as, for example, thermosetting polyurethane. Material of the intermediate part 14 is able to yield into openings 120 provided in the input flange 12 under heavy loading.

Provided at the underside of the intermediate part 14 facing away from the input flange via a connecting element 18 illustrated dark in the sectioned view is a further flange 13 which is secured to the baseplate 11 illustrated circular as shown in FIG. 1. Protruding from the baseplate 11 in the direction of the intermediate part 14 are index pins 16 required for correct Cartesian orientation.

To ensure a non-rotative and non-slip connection between the input flange 12, on the one hand, and the connecting element 18 or flange 13, on the other, for example, both the underside of the input flange 12, the top and bottom sides of the intermediate part 14 and of the connecting element 18 as well as the surface area of the flange 13 facing the intermediate part 14 are provided corrugated, or similar, (not shown in FIG. 1).

Figure 3:
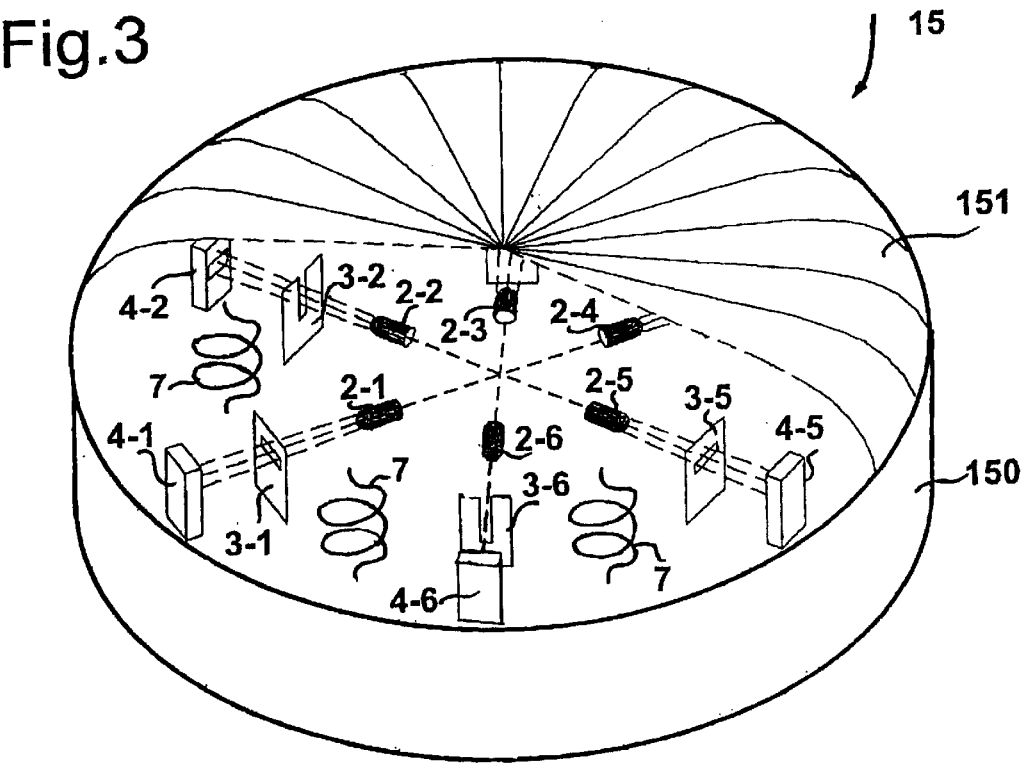
FIG. 3 is a diagrammatic view of a sensing unit containing an optoelectronic force/moment sensor including a cap shown partly sectioned.
Figure 4:
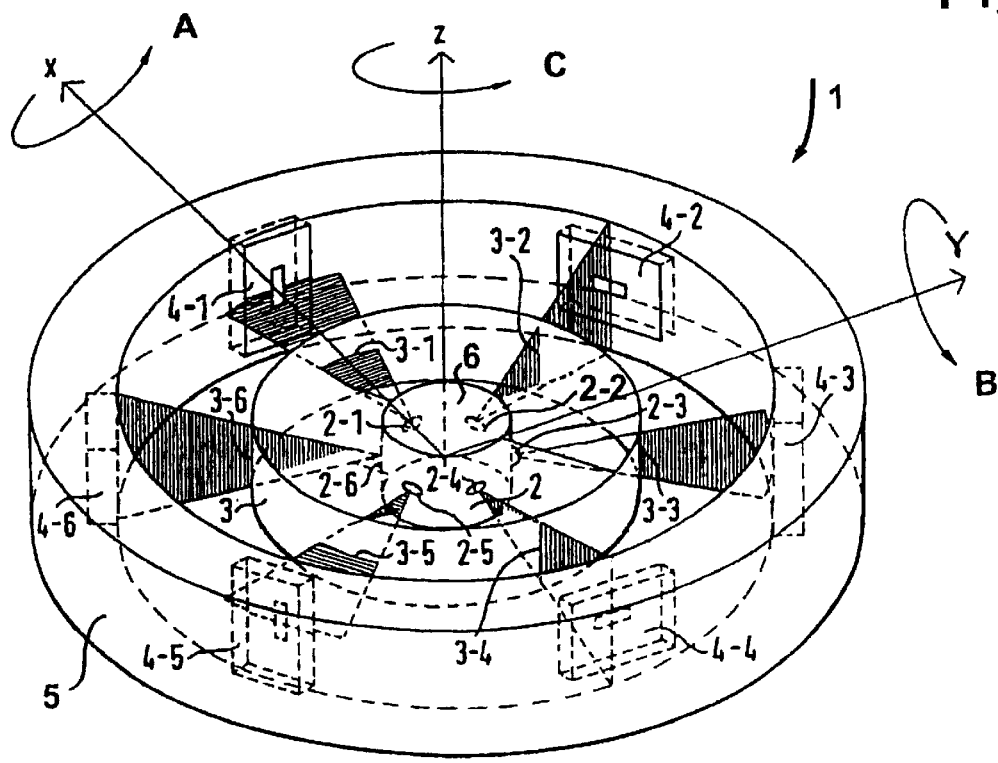
FIG. 4 is a view of the optoelectronic array provided in the sensing unit as shown in FIG. 3.

Illustrated in the middle free portion of the intermediate part 14 configured approximately circularly is a sensing unit identified in its entirety by reference numeral 15, in the interior of which, for example, a force/moment sensor 1 in the form of an optoelectronic array as known from DE 36 11 336 C2 or EP 0 240 023 B1 is provided as shown in both FIG. 3 and FIG. 4 schematically. The sensing unit 15 comprises in the embodiment as illustrated a cap 150 whose circular cylindrical edge portion translates into a domed cap surface 151.

The domed cap surface 151 is secured in the middle of the input flange 12 by means of a fastener 17, for example, in the form of a socket-head screw. As detailed in the following the circular cylindrical edge portion of the cap 150 may be connected, for example, to a cylindrical ring 5 at which in the embodiment as shown in FIG. 4 a number of photosensitive detectors 4-1 to 4-6 are attached.

As soon as forces and/or torques are exerted on the sensing unit 15 with the force/moment sensor 1 by the object secured to the input flange 12, both the forces and the torques result in the intermediate part 14 being correspondingly deformed. The resulting translational or rotational relative movements between the input flange 12 and the flange 13 secured to the baseplate 11 are transmitted by the fastener 17 from the input flange 12 via the domed cap surface 151 to the ring 5 of the optoelectronic array serving as the force/moment sensor connected as described above to the cap 150. The configuration and function of the optoelectronic array will now be detailed with reference to FIGS. 3 and 4.

Figure 2:
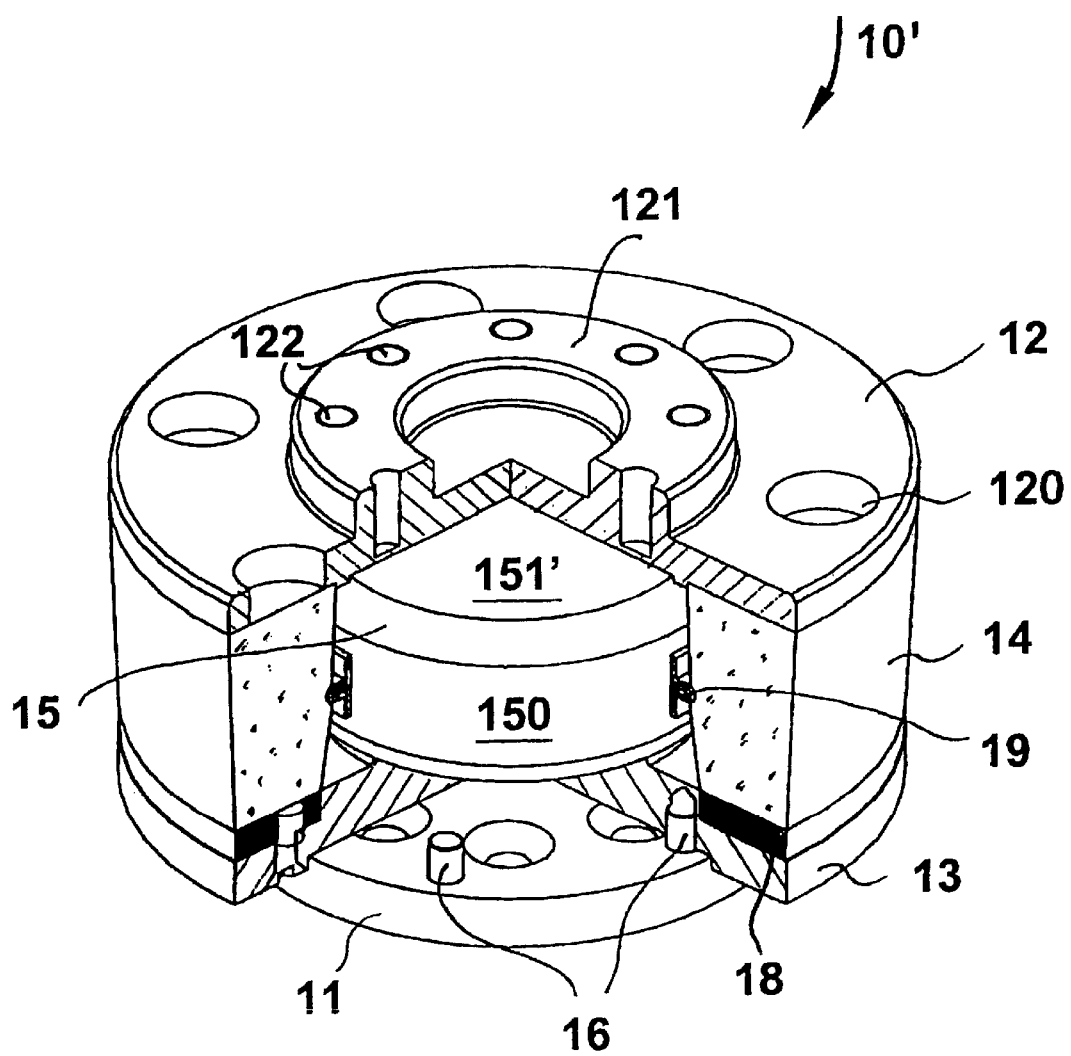
FIG. 2 is likewise a view in perspective of a modification of the embodiment as shown in FIG. 1 partly sectioned schematically.

The sole difference between the embodiment of the means 10 in accordance with the invention as shown in FIG. 1 and the means 10' as shown in FIG. 2 is that unlike FIG. 1 the sensing unit 15 including the force/moment sensor 1 provided in its interior is not secured to the input flange, it instead, as shown in FIG. 2, being connected via the circular cylindrical edge of the cap 150 to a connecting part 19 mounted non-rotatively in the middle portion of the intermediate part 14.

Due to the transmission via the connecting part 19 attached to the middle portion of the intermediate part 14 only approximately half of the translational and rotational values is available for analysis in the sensing unit 15.

Referring now to FIG. 3 there is illustrated schematically a sensing unit 15 including a force/moment sensor in the form of an optoelectronic array depicted schematically in FIG. 4. In FIG. 3 the sensing unit 15 as indicated therein schematically comprises a cap 150 shown circular cylindrical in the illustrated embodiment including a domed cap surface 151, shown partly sectioned in FIG. 3 to indicate part of the schematically depicted configuration of a force/moment sensor 1 in the form of the optoelectronic array indicated schematically.

Referring now to FIG. 4 there is illustrated how the optoelectronic array illustrated schematically includes six light-emitting means 2-1 to 2-6, preferably in the form of six light-emitting diodes arranged in a single plane. Assigned to each light-emitting means 2-1 to 2-6 is a slit diaphragm 3-1 to 3-6 at a fixed spacing therefrom. In this arrangement the juxtaposed slit diaphragms (slotted apertures) are configured each staggered from the other by 90° as regards their main direction of extension in a cylindrical ring so that, for example, the slit of slit diaphragm 3-1 is oriented horizontal and the slits of the two adjoining slit diaphragms 3-2 and 3-6 are oriented vertically.

Arranged in the optoelectronic array as shown in FIG. 4 are six position/photo-sensitive detectors 4-1 to 4-6 in a cylindrical ring 5 oriented correspondingly to the slit diaphragms 3-1 to 3-6 assigned thereto. Furthermore, the ring 5 with the six position-sensitive detectors 4-1 to 4-6 is fixedly secured to the inner side of the cylindrical cap 150 (FIG. 3).

Since the six light-emitting means 2-1 to 2-6 are accommodated in a supporting means 6 illustrated schematically in FIG. 4 as a cylinder, which is in turn stationary arranged in the sensing unit 15, via the cap 8, the ring 5 fixedly secured thereto including the six position-sensitive detectors 4-1 to 4-6 attached thereto is movable relative to the stationary array of the six light-emitting means 2-1 to 2-6 and the slit diaphragm ring 3 fixedly assigned thereto.

The stationary supporting means 6 illustrated schematically as a cylinder in FIG. 4 may also be configured in one practical embodiment, for example, as a stationary disk, the diameter of which approximately corresponds to the outer diameter of the ring 5 carrying the position-sensitive detectors 4-1 to 4-6 and which may be arranged above or below the ring 5.

Disposed between the position-sensitive detectors 4-1 to 4-6 and one such disk-shaped supporting means 6 are spring elements 7 (see FIG. 3) in the form of coil springs fixedly assigned to both the ring 5 and supporting means 6 by means of studs (not shown).

By means of the coil springs 7 it is assured that the ring 5 carrying the detectors 4-1 to 4-6 is movable via the cap 150 relative to the stationary array of the light-emitting means 2-1 to 2-6 and the slit diaphragm ring 3 fixedly assigned thereto in the direction of the three axes X, Y, Z of a rectangular spatial system of coordinates and about these three axes and returns to its starting position each time after every linear displacement or rotational excursion.

The six light-emitting means 2-1 to 2-6 are arranged in a single plane equispaced angularly from each other, i.e. at an angle of 60° and comprise the slit diaphragms 3-1 to 3-6 oriented alternatingly horizontal and vertical. As evident from the location of the individual slit diaphragms 3-1 to 3-6 and the individual light-emitting means 2-1 to 2-6, each highlighted by being depicted shaded, the axes of the individual position-sensitive detectors 4-1 to 4-6 are always oriented perpendicular to the slit diaphragms 3-1 to 3-6 assigned thereto.

This optoelectronic array permits total sensing of all six possible motion components, namely the three translational movements in the direction of the three axes X, Y and Z of a rectangular spatial system of coordinates and the three rotational movements A, B and C about the three axes X, Y and Z.

Since the cap 150 is fixedly attached to the ring 5 carrying the position-sensitive detectors 4-1 to 4-6 and this ring 5 is springingly connected to the stationary supporting means 6 by means of spring elements 7 (FIG. 3), the supporting means 6 mounting the six light-emitting means 2-1 to 2-6 and the slit diaphragms 3-1 to 3-6 assigned thereto, the spring elements 7 maintain the complete measuring system at mechanical zero when the cap 150 is exposed to neither a force nor a torque.

In a modification of the optoelectronic array as shown in FIG. 4 the position-sensitive detectors 4-1 to 4-6 are attached to a stationary arranged ring corresponding, for example, to the ring as shown in FIG. 4. In this case, unlike the array as shown in FIG. 4, the slit diaphragms 3-1 to 3-6 are arranged in common on a, for example, approximately circular ring-shaped supporting part which is connected to the inner side of the domed cap surface 151 of the sensing unit 15.

Furthermore, unlike the optoelectronic array as shown in FIG. 4 spring elements are disposed between the part carrying the slit diaphragms 3-1 to 3-6, on the one hand, and the stationary array ring including the position-sensitive detectors 4-1 to 4-6 attached thereto as well as the light-emitting means 2-1 to 2-6 arranged stationary, on the other, so that the supporting part and thus the slit diaphragms 3-1 to 3-6 provided thereon are movable relative to the stationary array of the position-sensitive detectors and the light-emitting means so that they are always returned to their starting position.

The difference between the optoelectronic array as described above and the optoelectronic array as described relative to FIG. 4 is thus that now the slit diaphragms 3-1 to 3-6 are movable relatively to both the stationary arranged light-emitting means 2-1 to 2-6 and relative to the likewise stationary arranged position-sensitive detectors 4-1 to 4-6.

One advantage of the array as described above as compared to the array as shown in FIG. 4 is that the supporting part with the slit diaphragms 3-1 to 3-6 has, for one thing, considerably less weight than the ring 5 with the position-sensitive detectors 4-1 to 4-6 and, for another, the slit diaphragms 3-1 to 3-6 are passive elements which do not need to be wired for power.

Each position-sensitive detector of the optoelectronic array is assigned its own light source which is signaled by a simple electronic closed loop control, with the aid of which differences in detector sensitivity, LED efficiency, tolerances in the electronic components as well as temperature drifts are automatically and speedily compensated, thus eliminating the need for any additional calibration.

What is claimed is:

1. A device for sensing the relative movements of an object, said device comprising an input flange securable to the object, a second flange rigidly connected to a baseplate and an approximately ring-shaped intermediate part configured as a one-piece part or a multiple-piece part composed of several elements arranged juxtaposed, said intermediate part being disposed between said two flanges and being connected to said two flanges non-rotatively and in a non-slip manner, and said intermediate part being made at least partly of an elastomer or cast resin, and a force sensing unit provided in the interior portion of said intermediate part for sensing the movement of each flange relative to the other, wherein said force sensing unit (15) includes a stationary supporting means (6) and a cap (150) located movable relative to said supporting means as well as a force-torque sensor (1) for sensing the three possible translational and three possible rotational movements of the cap relative to said supporting means and wherein said sensing unit with its cap is secured in the middle of said input flange and with its supporting means to said second flange so that it does not come into contact with said intermediate part (14), or is secured differingly to the latter by its cap to a connecting part (19) provided in the middle portion of said intermediate part (14') and protruding into the interior thereof and by its supporting means to said second flange, so that translational and rotational relative movements between said input flange and said second flange secured to said baseplate are communicated by way of said intermediate part to said sensing unit and to said force-torque sensor contained therein.

2. The device as set forth in claim 1, wherein said multiple-piece intermediate part is formed of ring-shaped sections of approximately rectangular cross-section.

3. The device as set forth in claim 1, wherein said multiple-piece intermediate part is formed of approximately circularly arranged cuboidal elements.

4. The device as set forth in claim 1, wherein said multiple-piece intermediate part is formed of cylindrical elements arranged approximately circularly with a square, rectangular, polygonal or circular cross-section.

5. The device as set forth in claim 1, wherein said intermediate part contains same or differingly dimensioned webs or also struts preferably arranged like a trussed structure.

6. The device as set forth in claim 1, wherein said elements of said multiple-piece intermediate part are configured as a hollow body having a cross or criss-cross type structure.

7. The device as set forth in claim 1, wherein said elastomer or cast resin is a thermosetting polyurethane.

8. The device as set forth in claim 1, wherein an optoelectronic array for simultaneously sensing six components (X, Y, Z: A, B, C) in or about the three axes (X, Y, Z) of a rectangular spatial system of coordinates is provided in the interior of said sensing unit (15) as said force-torque sensor (1), said array comprising at least six light-emitting means (2-1 to 2-6) each applied in a single plane equispaced angularly from each other, each including a fixedly assigned fronting slit diaphragm (3-1 to 3-6) being provided opposite a position-sensitive detector (4-1 to 4-6) oriented by its detector axis perpendicular to the slit direction of each assigned slit diaphragm (3-1 to 3-6) so that either said light-emitting means (2-1 to 2-6) including said assigned slit diaphragms (3-1 to 3-6) and said position-sensitive detectors (4-1 to 4-6) or said slit diaphragms (3-1 to 3-6) and said light-emitting means (2-1 to 2-6) as well as said position-sensitive detectors (4-1 to 4-6) are movable relative to each other.

9. The device as set forth in claim 8, wherein said at least six light-emitting means (2-1 to 2-6) each fronted by a slit diaphragm (3-1 to 3-6) positioned fixedly spaced away therefrom are provided stationary, juxtaposed slit diaphragms are configured each staggered by 90° relatively to their main direction of extension and six position-sensitive detectors (4-1 to 4-6) movable in common relative to their slit diaphragms (3-1 to 3-6) are provided, each detector axis of which is orientated perpendicular to said slit direction of each assigned slit diaphragm (3-1 to 3-6).

10. The device as set forth in claim 9, wherein said position-sensitive detectors (4-1 to 4-6) are arranged correspondingly orientated on the inner side of a cylindrical ring (5) which is fixedly attached to the inner side of a cap (8) of said sensing unit (15) and which via spring elements (7) disposed between said ring (5) and a supporting means (6) carrying in the middle said light-emitting means (2-1 to 2-6) is movable relative to said stationary array of said at least six light-emitting means (2-1 to 2-6) and said at least six slit diaphragms (3-1 to 3-6) each assigned thereto so that said ring (5) is always returned to its starting position.

11. The device as set forth in claim 10, wherein said at least six light-emitting means (2-1 to 2-6) are accommodated in a supporting means (6) with which a cylindrical ring (3) is fixedly connected in which slit diaphragms (3-1 to 3-6) are provided in the same angular spacing as those of said light-emitting means (2-1 to 2-6) attached to said supporting means (6) and each staggered 90° relative to the other alternatingly as regards their main direction of extension radially opposed.

12. The device as set forth in claim 9, wherein said at least six light-emitting means (2-1 to 2-6) are accommodated in a supporting means (6) with which a cylindrical ring (3) is fixedly connected in which slit diaphragms (3-1 to 3-6) are provided in the same angular spacing as those of said light-emitting means (2-1 to 2-6) attached to said supporting means (6) and each staggered 90° relative to the other alternatingly as regards their main direction of extension radially opposed.

13. The device as set forth in claim 8, wherein said six light-emitting means (2-1 to 2-6) and said position-sensitive detectors (4-1 to 4-6) orientated relative thereto are provided stationary, and said slit diaphragms (3-1 to 3-6) each arranged fixedly spaced away from said light-emitting means (2-1 to 2-6) are arranged movable in common relative to said position-sensitive detectors (4-1 to 4-6), said juxtaposed slit diaphragms being configured staggered by 90° relatively to their main direction of extension.

14. The device as set forth in claim 13, wherein said position-sensitive detectors (4-1 to 4-6) are arranged stationary and correspondingly orientated relative to said stationary array of said light-emitting means (2-1 to 2-6) and said slit diaphragms (3-1 to 3-6), arranged in common on a supporting part connected to the inner side of said domed cap surface (151) of said sensing unit (15), are movable via said spring elements (7) disposed between said supporting part and said stationary array of said position-sensitive detectors (4-1 to 4-6) and said light-emitting means (2-1 to 2-6) so that said supporting part and thus said slit diaphragms (3-1 to 3-6) arranged thereon always return to their starting position.

15. The device as set forth in claim 13, wherein said at least six light-emitting means (2-1 to 2-6) are accommodated in a supporting means (6) with which a cylindrical ring (3) is fixedly connected in which slit diaphragms (3-1 to 3-6) are provided in the same angular spacing as those of said light-emitting means (2-1 to 2-6) attached to said supporting means (6) and each staggered 90° relative to the other alternatingly as regards their main direction of extension radially opposed.

16. The device as set forth in claim 8, wherein said position-sensitive detectors (4-1 to 4-6) are arranged correspondingly orientated on the inner side of a cylindrical ring (5) which is fixedly attached to the inner side of a cap (8) of said sensing unit (15) and which via spring elements (7) disposed between said ring (5) and a supporting means (6) carrying in the middle said light-emitting means (2-1 to 2-6) is movable relative to said stationary array of said at least six light-emitting means (2-1 to 2-6) and said at least six slit diaphragms (3-1 to 3-6) each assigned thereto so that said ring (5) is always returned to its starting position.

17. The device as set forth in claim 8, wherein said position-sensitive detectors (4-1 to 4-6) are arranged stationary and correspondingly orientated relative to said stationary array of said light-emitting means (2-1 to 2-6), and said slit diaphragms (3-1 to 3-6), arranged in common on a supporting part connected to the inner side of said domed cap surface (151) of said sensing unit (15), are movable via said spring elements (7) disposed between said supporting part and said stationary array of said position-sensitive detectors (4-1 to 4-6) and said light-emitting means (2-1 to 2-6) so that said supporting part and thus said slit diaphragms (3-1 to 3-6) arranged thereon always return to their starting position.

18. The device as set forth in claim 1, wherein said device is attached between the end of a robotic arm and a supporting or gripping device.

19. At least three devices, each as set forth in claim 1, wherein said devices are arranged under a platform on which a robotic device, a machine tool, a crane or a machine configured correspondingly in function and design is mounted.

20. The device as set forth in claim 1 in vehicle final assembly, wherein said device is provided in or on each pin of racks on which frames are positioned to which further frame and/or body parts of a motor vehicle are secured by means of welding tongs.

21. A plurality of devices, each as set forth in claim 1, wherein said devices are arranged under a gangplate arranged at the entrance to a security area.

* * * * *